W. S. PLATT.
VEHICLE AXLE.
No. 244,661. Patented July 19, 1881.
Fig. 1.
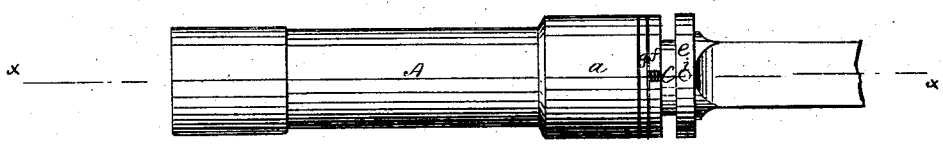
Fig. 2.
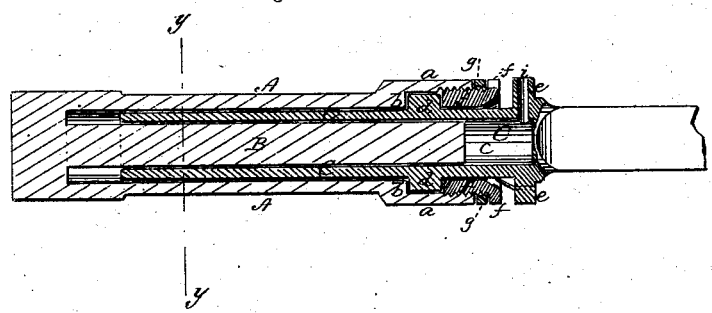
Fig. 3.
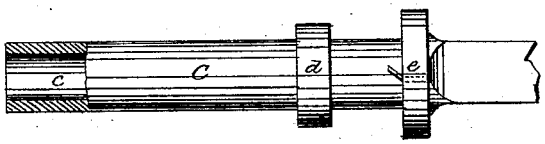
Fig. 4. Fig. 5.
 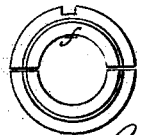
Fig. 6.
Witnesses:
N. L. Wattenberg
Chas. Nida
Inventor:
William S. Platt
per J. M. Upton
Atty

UNITED STATES PATENT OFFICE.

WILLIAM S. PLATT, OF WATERBURY, CONNECTICUT.

VEHICLE-AXLE.

SPECIFICATION forming part of Letters Patent No. 244,661, dated July 19, 1881.

Application filed November 21, 1878.

*To all whom it may concern:*

Be it known that I, WILLIAM S. PLATT, of Waterbury, in the county of New Haven and State of Connecticut, have invented a new and Improved Axle and Axle-Box; and I do hereby declare that the following is a full, clear, and exact description of the same, reference being had to the accompanying drawings, and to the letters of reference marked thereon, making part of this specification.

This invention is in the nature of an improvement in axles and axle-boxes; and the invention consists in an axle-box constructed with a spindle centrally placed and fixed within it, and an axle-arm consisting substantially of a hollow cylinder, within which is received the interior spindle of the box, the spindle within the box forming an interior bearing-surface for the axle-arm, and the outer surface of the axle-arm also forming a bearing within the box, so that the axle-arm, in this way constructed, has two bearing-surfaces within the axle-box which receives it, the axle-arm being provided with a collar, and also with a nut, whereby the axle-arm is retained within the box, and the wearing of the collar and the end of the axle-arm within the box taken up.

In the accompanying sheet of drawings, Figure 1 is a side view of my axle and axle-box; Fig. 2, a longitudinal section of same in the line $x\ x$, Fig. 1; Fig. 3, a side view of axle-arm, partly in section; Fig. 4, a cross-section through line $y\ y$, Fig. 2; Fig. 5, a front view of sectional nut, and Fig. 6 a front view of ring for sectional nut.

Similar letters of reference indicate like parts in the several figures.

In axles for vehicles, as they are ordinarily constructed, the axle-arm is made so as to have but one bearing-surface within the axle-box—that is, its outer surface; and as the arm wears within the box, or as the box wears around the arm, or as they both become worn, the loose fitting between the axle-arm and the box in this way produced causes lost motion and rattling, and the wheel no longer revolves truly.

To obviate this defect, and to construct an axle-arm and axle-box that will insure a true revolution of the wheel and prevent the unequal wearing of the axle-box and the axle-arm within it, and at the same time to provide for the complete and uniform lubrication of the axle-arm within the box, I construct my box A with a spindle, B, centrally fixed within the box at its outer end. This spindle is cylindrical, and may extend upward within the box more or less, or to very nearly its entire length, as shown in Fig. 2. The upper end of the box A is enlarged at $a$, and counterbored to form a shoulder, $b$, within it, and has screw-threads cut within the interior of the enlarged portion $a$, the outer end of the box being closed and without opening.

The axle-arm C is cylindrical, and of an outer diameter corresponding in size to the interior diameter of the box A, within which it closely fits. Into the axle-arm C, and in the direction of its length, is bored a cylindrical opening, $c$. This cylindrical opening is of a diameter that will enable the spindle B to snugly fit within it, so that when the axle-arm is placed within the axle-box the exterior surface of the arm will closely fit within the interior surface of the box, and the exterior surface of the spindle will closely fit within the cylindrical opening $c$.

To the axle-arm C is fixed a collar, $d$, which is received within the enlarged portion $a$ of the box and rests against the shoulder $b$ within it when the arm is within the box, as just described; and also on the arm C, between the collar $d$ and a flange, $e$, formed thereon, is placed a nut, $f$, with screw-threads cut upon it to correspond with the screw-threads cut within the enlarged portion $a$ of the box. If the collar $d$ is forged upon the arm, the nut $f$ may be made in two pieces, as shown in Fig. 5, so that it can be readily applied to the arm; but if the collar $d$ is screwed or keyed in place, the nut $f$ need not be so cut. When it is cut, however, the ring $g$, placed around the nut, will serve to keep the sections of the nut in place when the axle-arm is removed from the box, and the ring also serves the purpose of a washer. Into the flange $e$ is drilled an oil-hole, $i$. This oil-hole opens into the cylindrical opening $c$ in the axle-arm.

Now, the axle-box and axle-arm, constructed substantially as I have described them, are combined by placing the arm within the box, in the manner hereinbefore described, and screwing the nut $f$ within the enlarged portion $a$ of the box, which secures the arm within the box; and when in this position it will be seen that the axle-arm revolves on two bearings, the bearing formed by the exterior of the spindle B within the cylindrical opening $c$ of the axle-arm, and the bearing formed by the interior of the box on the exterior of the axle-arm, thereby increasing the bearing-surface and producing steadiness and trueness in the revolution of the wheel, and preventing unequal wearing of the arm within the box and rattling, and also reducing the amount of general wear.

Should the box, axle-arm, spindle, and collar become worn, so as to cause end play to any extent, this end play can be at once taken up by means of the nut $f$, and, if need be, by reducing the thickness of the metal ring $g$, or, if necessary, by placing two or more metal rings of similar character upon the nut $f$, and by removing one of these rings, enable the nut to be operated for the purpose of taking up end play. It is not believed, however, that any end play can take place which will require attention, until after a very long use or service, in an axle-box and axle-arm properly constructed, as has been described.

Still another and important advantage is derived from the construction of an axle-box and axle-arm as described, which advantage is the uniform distribution of the lubricant employed, for by my construction of axle and box a light, free-flowing oil may be employed, which from its character will readily flow and find access to all the parts of the arm and box and spindle, which would not be the case when the common axle-grease and other heavy lubricants are used with axles. The oil is inserted in the hole $i$, and passes through the cylindrical opening $c$, working its way between the spindle and the opening, thence to the end of the opening, and along and between the outer surface of the axle-arm and the interior surface of the box, thoroughly lubricating all the wearing portions of the arm. The opening $i$, through which the oil is introduced, should be stopped up to prevent the exit of the oil. The oil, it will be seen from the construction of my box, is prevented from escaping at its outer end. The ingress of grit and dust at the outer end is wholly obviated also.

Having now described my invention, what I claim as new, and desire to secure by Letters Patent, is—

1. An axle-arm constructed with a cylindrical opening, $c$, in combination with a spindle, B, fixed within the axle-box A, and received within the opening $c$ of the axle-arm, whereby an interior bearing is formed within the axle-arm, substantially as shown and described.

2. In an axle-arm, the combination of a revolving nut with one or more metallic rings around the same, substantially as and for the purpose described.

3. In an axle-arm, a sectional nut, in combination with one or more metallic rings, substantially as and for the purpose described.

WM. S. PLATT.

Witnesses:
C. S. ABBOTT,
E. G. ADAMS.